(12) United States Patent
Manzur et al.

(10) Patent No.: US 11,209,675 B1
(45) Date of Patent: Dec. 28, 2021

(54) ISOLATED PHOTONIC TRANSMITTER AND DETECTOR

(71) Applicant: The United States of America as represented by the Secretary of the Navy, Newport, RI (US)

(72) Inventors: Tariq Manzur, Lincoln, RI (US); Yifei Li, East Walpole, MA (US)

(73) Assignee: The United States of America as represented by the Secretary of the Navy

( * ) Notice: Subject to any disclaimer, the term of this patent is extended or adjusted under 35 U.S.C. 154(b) by 0 days.

(21) Appl. No.: 16/919,253

(22) Filed: Jul. 2, 2020

(51) Int. Cl.
*G02F 1/01* (2006.01)
*H04B 10/66* (2013.01)
*H04B 10/54* (2013.01)
*H04B 10/50* (2013.01)

(52) U.S. Cl.
CPC ......... *G02F 1/0123* (2013.01); *H04B 10/505* (2013.01); *H04B 10/54* (2013.01); *H04B 10/66* (2013.01)

(58) Field of Classification Search
CPC .. H04B 10/505; H04B 10/66; H04B 10/2507; G02F 1/0123
USPC ......................................................... 359/238
See application file for complete search history.

(56) References Cited

U.S. PATENT DOCUMENTS

| | | | | |
|---|---|---|---|---|
| 8,582,981 | B2* | 11/2013 | Akiyama | H04B 10/50575 398/188 |
| 9,172,471 | B2* | 10/2015 | Hutchinson | H04B 10/532 |
| 10,812,197 | B1* | 10/2020 | Li | H04B 10/2575 |
| 2002/0061034 | A1* | 5/2002 | Schneider | G02F 1/0123 372/26 |
| 2003/0091097 | A1* | 5/2003 | Yap | G02F 2/002 375/132 |
| 2005/0057791 | A1* | 3/2005 | Sayyah | G02F 1/0121 359/245 |
| 2007/0041735 | A1* | 2/2007 | Darcie | H04B 10/66 398/186 |
| 2007/0127932 | A1* | 6/2007 | Qi | H04B 10/548 398/188 |

(Continued)

OTHER PUBLICATIONS

Shi et al; Bias Controller of Mach-Zehnder Modulator for Electro-optic Analog-to-Digital Converter; Nov. 2019;MDPI electronics; pp. 1-10. (Year: 2019).*

(Continued)

*Primary Examiner* — Amritbir K Sandhu
(74) *Attorney, Agent, or Firm* — James M. Kasischke; Michael P. Stanley

(57) ABSTRACT

An optically biased photonic link receives a radio frequency (RF) signal and includes a signal laser joined to an optical intensity modulator. A low noise amplifier receives the RF signal and provides an amplified signal to the modulator. The modulator converts the signal into an optical signal. The amplifier and modulator are powered by a photovoltaic array. The array receives power from a remotely located power laser. The optical signal is received by a link receiver which provides an analysis signal and an output signal. A bias logic circuit uses the analysis signal to provide an optical bias signal to an optical detector joined to modulator. The optical detector provides a responsive bias voltage to the modulator.

6 Claims, 3 Drawing Sheets

(56) References Cited

U.S. PATENT DOCUMENTS

| | | | | |
|---|---|---|---|---|
| 2008/0019632 A1* | 1/2008 | Ishii | ............ | G02B 6/1228 |
| | | | | 385/2 |
| 2009/0047028 A1* | 2/2009 | Terahara | ............ | H04B 10/505 |
| | | | | 398/188 |
| 2010/0021182 A1* | 1/2010 | Asano | ............ | H04B 10/5561 |
| | | | | 398/188 |
| 2012/0263456 A1* | 10/2012 | Tanaka | ............ | H04B 10/5055 |
| | | | | 398/25 |
| 2014/0010530 A1* | 1/2014 | Goebuchi | ............ | H04B 10/54 |
| | | | | 398/25 |
| 2015/0155683 A1* | 6/2015 | Blauvelt | ............ | G02F 1/025 |
| | | | | 385/2 |
| 2018/0329235 A1* | 11/2018 | Vikulin | ............ | G02F 1/0123 |
| 2020/0192129 A1* | 6/2020 | Wang | ............ | G02F 1/0063 |

OTHER PUBLICATIONS

European Commission et al; Fiber-wireless Integrated Networks for 5th Generation delivery; Mar. 2018; European Commission; pp. 1-104. (Year: 2018).*

Shi et al; Bias controller of Mach-Zehnder Modulator for Eelctro-optic Analog to digital Converter; Nov. 2019; MDPI/micromachines; pp. 1-10 (Year: 2019).*

Petrov et al; System for Stabilizing an operating point of a remote electro-optical modulator powered by Optical fiber; Nov. 2020; MDPI/Electronics; pp. 1-10. (Year: 2020).*

* cited by examiner

ISOLATED PHOTONIC TRANSMITTER AND DETECTOR

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

This patent application is co-pending with two related patent applications entitled PHOTONIC TRANSMITTER WITH REMOTE POWER (Ser. No. 16/919,271), and OPTICALLY BIASED PHOTONIC TRANSMITTER AND DETECTOR (Ser. No. 16/919,263), by same inventor as this application.

BACKGROUND OF THE INVENTION

(1) Field of the Invention

The present invention is directed to a photonic transmitter that is buffered from local power fluctuations. It is further directed to a photonic transmitter having a bias that can be controlled remotely.

(2) Description of the Prior Art

A radio frequency (RF) photonic link is used for connecting a radio or radar signal from an antenna to a remote location. FIG. 1 shows a typical prior art RF photonic link. A link transmitter 10 receives an RF signal 12 at a low noise amplifier (LNA) 14. LNA 14 is joined to provide the amplified RF signal to an optical intensity modulator 16. Modulator 16 receives light from a signal laser 18 and uses the amplified RF signal to modulate the light into an intensity modulated optical signal. Intensity modulated optical signal is provided over optical fiber 20 to a link receiver 22.

Modulator 16 utilizes a Mach Zehnder interferometer having a splitter 24 that splits light from signal laser 18 to a first optical path 26 and a second optical path 28. An electrical field applied to one or both paths at a modulating electrode 30 and a ground electrode 32 introduces a differential phase change in optical signals in the paths. Ground electrodes are joined to ground 34. These optical signals having a differential phase interfere when first optical path 26 is combined with second optical path 28 such as at coupler 36. The signal voltage that causes a 180° phase shift results in destructive interference. This voltage is identified as $V_\pi$.

In common operation of modulator 16, a bias source 38 provides a bias voltage $V_{\pi,DC}$ at bias electrode 40. Bias voltage $V_{\pi,DC}$ is typically set at the quadrature bias or $V_{\pi/2}$ in order to optimize photonic link characteristics. Variations in RF signal input may make it desirable to change the bias voltage.

A remote direct current power supply is required for powering LNA 14 and bias source 34. The power supply is often shared between various electronic components located proximate to RF input 12. This configuration is prone to ground loop problems and electro-magnetic interference. In addition, optical intensity modulator 10 is known to suffer from bias drifting caused by environmental perturbations, such as temperature, pressure, and humidity. For optimum operation, the modulator bias voltage should be adjusted in real time; however, placing a bias source with sophisticated bias control logic digital circuitry within the RF photonic link increases its size, cost and complexity.

SUMMARY OF THE INVENTION

It is a first object of the present invention to provide a photonic transmitter that is not subject to local power fluctuations.

Another object is to provide a photonic transmitter having remotely controlled bias.

Accordingly, there is provided an optically biased photonic link that receives a radio frequency (RF) signal and includes a signal laser joined to an optical intensity modulator. A low noise amplifier receives the RF signal and provides an amplified signal to the modulator. The modulator converts the signal into an optical signal. The amplifier and modulator are powered by a photovoltaic array. The array receives power from a remotely located power laser. The optical signal is received by a link receiver which provides an analysis signal and an output signal. A bias logic circuit uses the analysis signal to provide an optical bias signal to an optical detector joined to modulator. The optical detector provides a responsive bias voltage to the modulator.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

Figure 1:
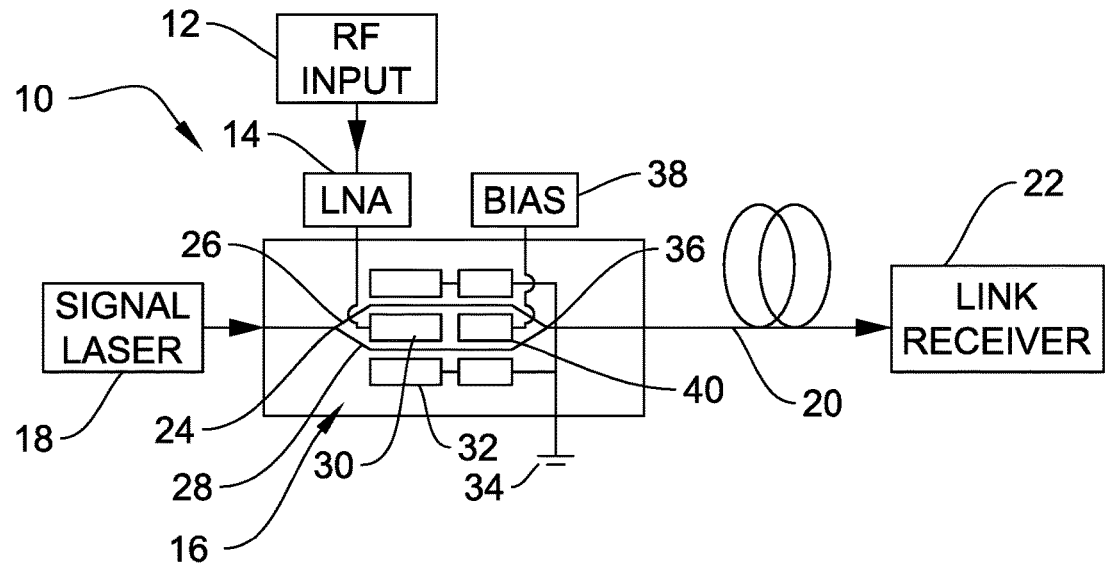
FIG. 1 is a diagram of a prior art photonic transmitter.
Figure 2:
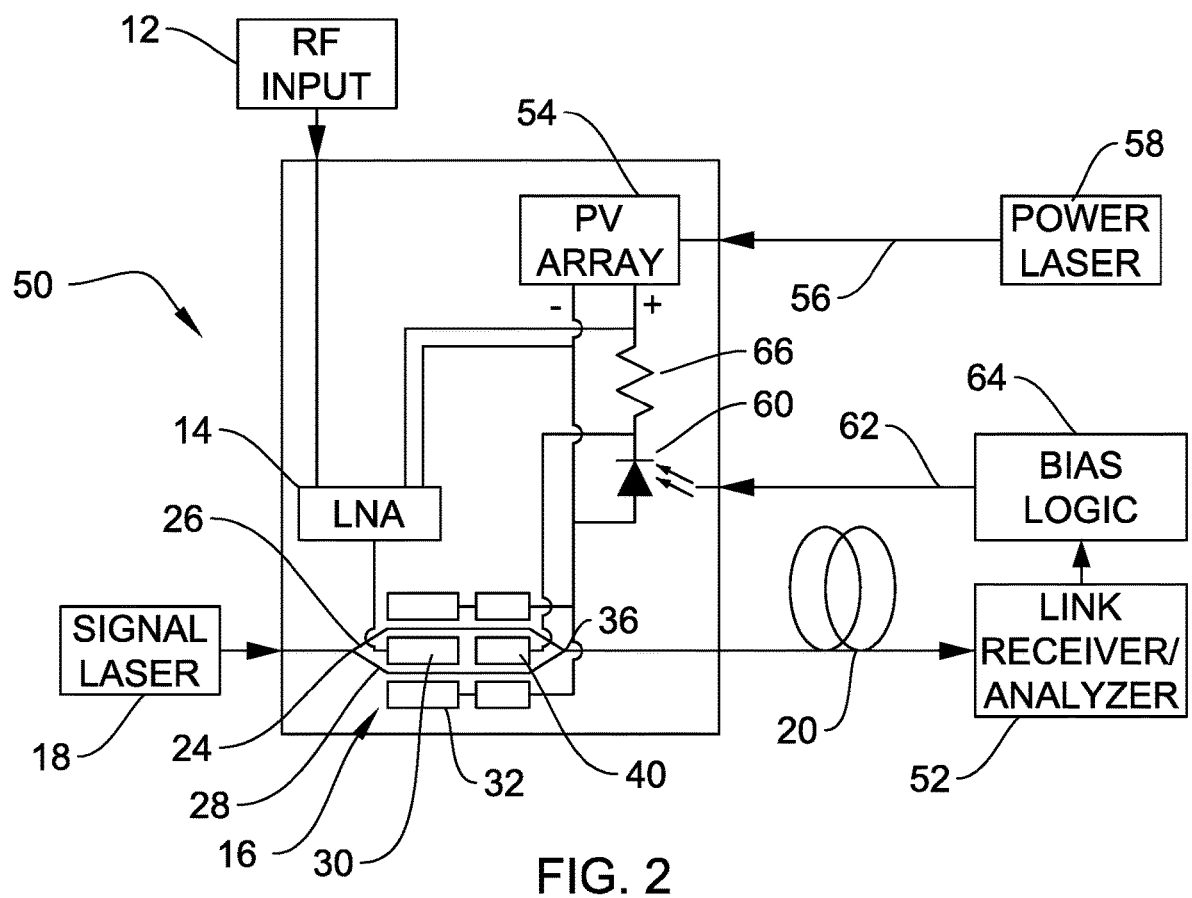
FIG. 2 is a diagram of a first embodiment of a photonic transmitter having remote power and bias control.

FIG. 2 shows an embodiment of an electrically isolated RF photonic link. This embodiment utilizes remote electrical energy delivery and remote modulator bias control. Link transmitter 50 receives an RF signal 12 at LNA 14. As before, LNA 14 provides an amplified signal to optical intensity modulator 16. Signal laser 18 provides light to modulator 16 which provides an intensity modulated optical signal over optical fiber 20 to a link receiver/analyzer 52.

In modulator 16, light from signal laser 18 is split by splitter 24 into two paths 26 and 28. Signal from LNA 14 is provided to a modulating electrode 30 which cooperates with ground electrode 32 to generate an electric field. Electric field modifies the refractive index of either one or both paths 26 and 28 resulting in a relative phase change between paths 26 and 28. When optical signals on paths 26 and 28 are combined in coupler 36, the resulting optical signal is intensity modulated. The intensity modulated signal is provided on optical fiber 20.

Link transmitter 50 is electrically joined to a photovoltaic array 54 to avoid noise. Photovoltaic array 54 receives light from optical fiber power link 56 which is joined to a remotely located power laser 58. Thus, LNA 14 is electrically isolated from other electrical devices related to RF input 12. Ground loop and electromagnetic interference problems are thus avoided.

The bias source is also isolated from local electrical devices. A photodiode 60 is provided to receive an optical bias control signal from optical fiber bias link 62. Optical fiber bias link is joined to a bias logic source 64 which includes an optical transmitter. Photodiode 60 converts optical energy from bias control signal into a bias voltage which is applied to bias electrode 40. Bias logic source 64 is joined to link receiver and analyzer 52 to receive information about the condition of the intensity modulated optical signal such as the optical power and nonlinearities. Remote placement of modulator bias logic simplifies link transmitter 50 and allows feedback to compensate for environmental and signal factors affecting the optical link. Resistor 66 is used to provide a base level of bias voltage from photovoltaic array 54 to bias electrode 40.

In further detail, power laser 58 should have a power of about 10 w. The optical energy can be in any wavelength of convenience, including 0.8 micron, 1.0 micron, 1.5 micron and etc. Power laser 58 can be a semiconductor laser, fiber laser, bulk solid state laser, or the like.

Photovoltaic array 54 is an array of photovoltaic cells for generating a constant DC voltage to provide power to LNA 14. Photovoltaic array 54 cathode serves as the ground for modulator 16 and other circuitry. Photovoltaic array 54 preferably utilizes GaAs or InGaAsP/InP technologies that enable highly efficient optical-to-electric DC power conversion. The photovoltaic cells making up array 54 can utilize PIN device configuration for maximizing efficiency. Twenty photovoltaic cells in array 54, each having an active area of 1 $mm^2$ can generate a 4 volt DC voltage and >2A current. Photovoltaic array 54 is preferably integrated with modulator 16 by flip-chip bonding.

FIG. 2 shows an active bias control signal in which a base level of bias voltage is powered by photovoltaic array 54. Additional bias voltage is provided by photodiode 60 in response to optical bias control signal. A InGaAsP/InP PIN photodetector is preferred as photodiode 60 for controlling the modulator bias voltage. The modulator bias voltage is thus adjusted in real-time to assure an optimum modulator bias condition. The bias voltage circuitry is also integrated on chip with modulator 16 and other RF photonic transmitter components using flip-chip bonding.

Figure 3:
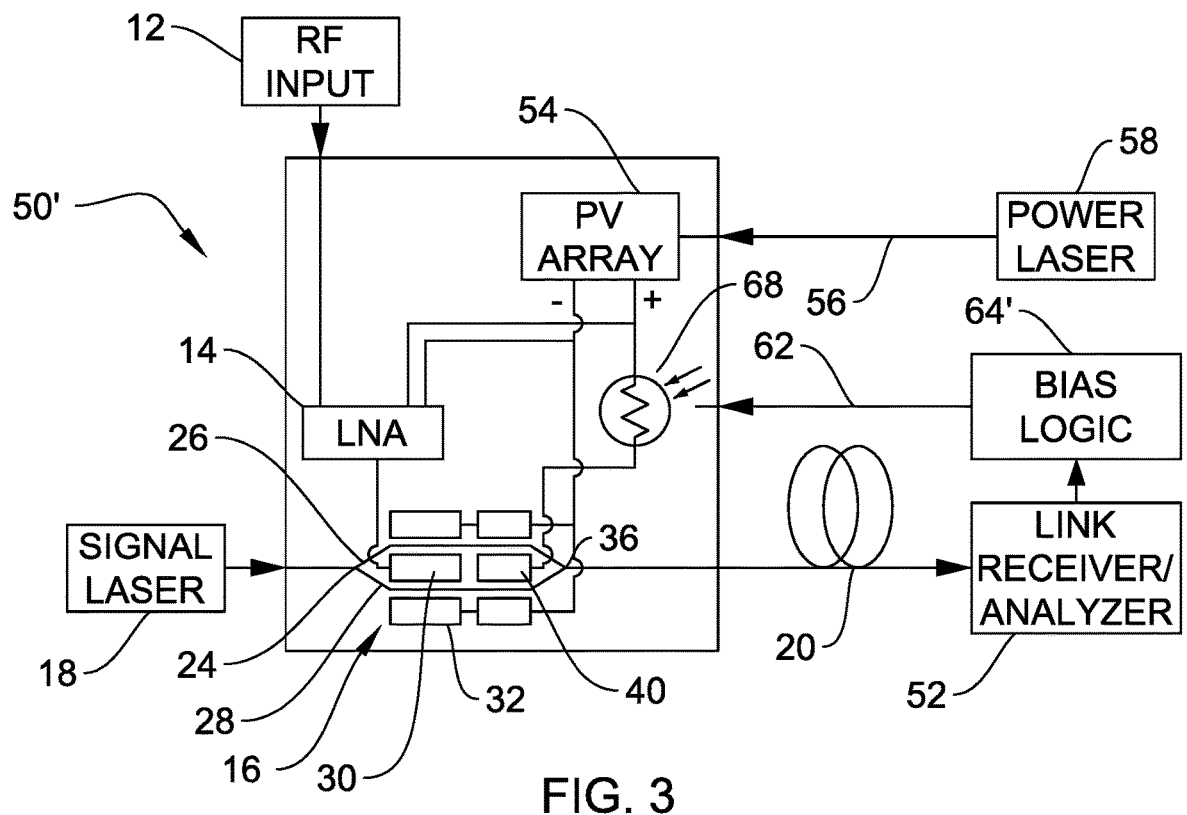
FIG. 3 is a diagram of a second embodiment of a photonic transmitter having remote power and bias control.

FIG. 3 shows an alternate embodiment 50' of the link transmitter. This embodiment utilizes a photoresistor 68 in place of photodiode 60 and resistor 66. Photoresistor 68 has a base level of resistance that can be used for providing a basic level of bias to modulator 16. Additional bias voltage can be provided by increasing the optical bias control signal from bias logic source 64'. This reduces the resistance in photoresistor 68. Instead of relying on power from photodiode 60 as in FIG. 2, all of the bias voltage in this embodiment originates from photovoltaic array 54.

Figure 4:
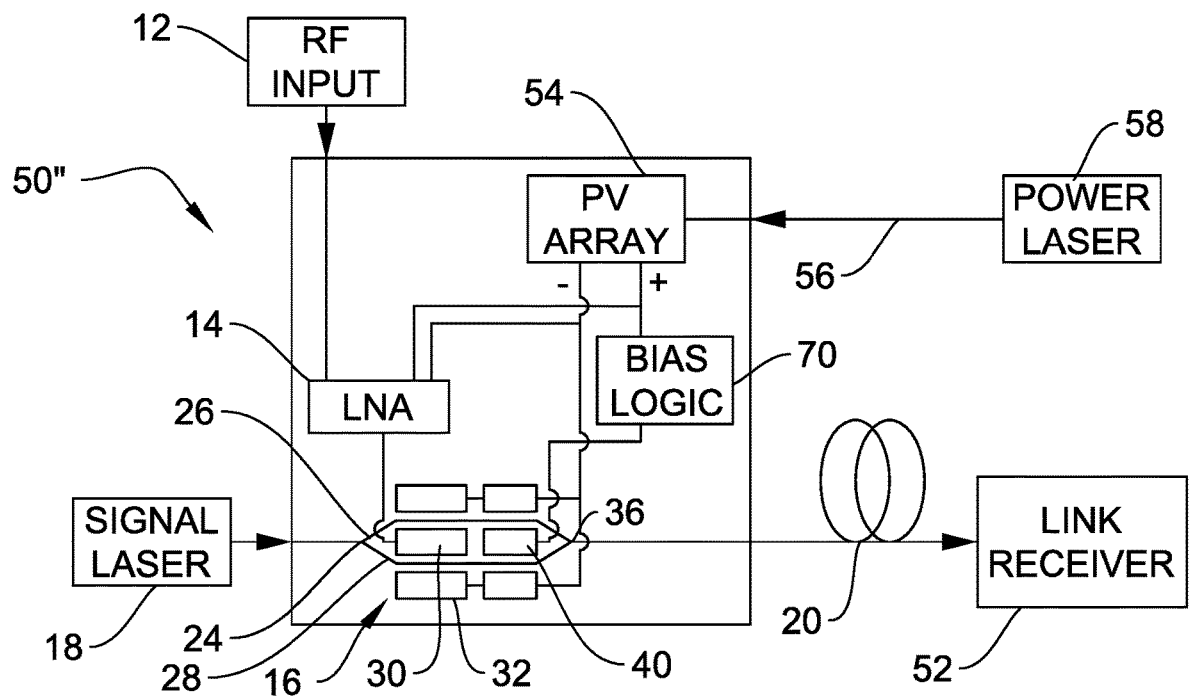
FIG. 4 is a diagram of a third embodiment of a photonic transmitter having remote power and local bias control.

FIG. 4 shows an additional alternate embodiment 50" that utilizes external power for LNA 14 and internal bias logic 70. Internal bias logic 70 is directly powered by photovoltaic array 54. As in previous embodiments, photovoltaic array 54 is powered by optical fiber power link 56 joined to power laser 58. Internal bias logic 70 utilizes internal linkages and conditions to provide a bias voltage from photovoltaic array 54. Bias logic 70 can be joined to LNA 14 for analysis of RF signal conditions. The embodiment shown in FIG. 4 simplifies the external connections by not utilizing the optical bias control signal utilized in other embodiments.

Figure 5:
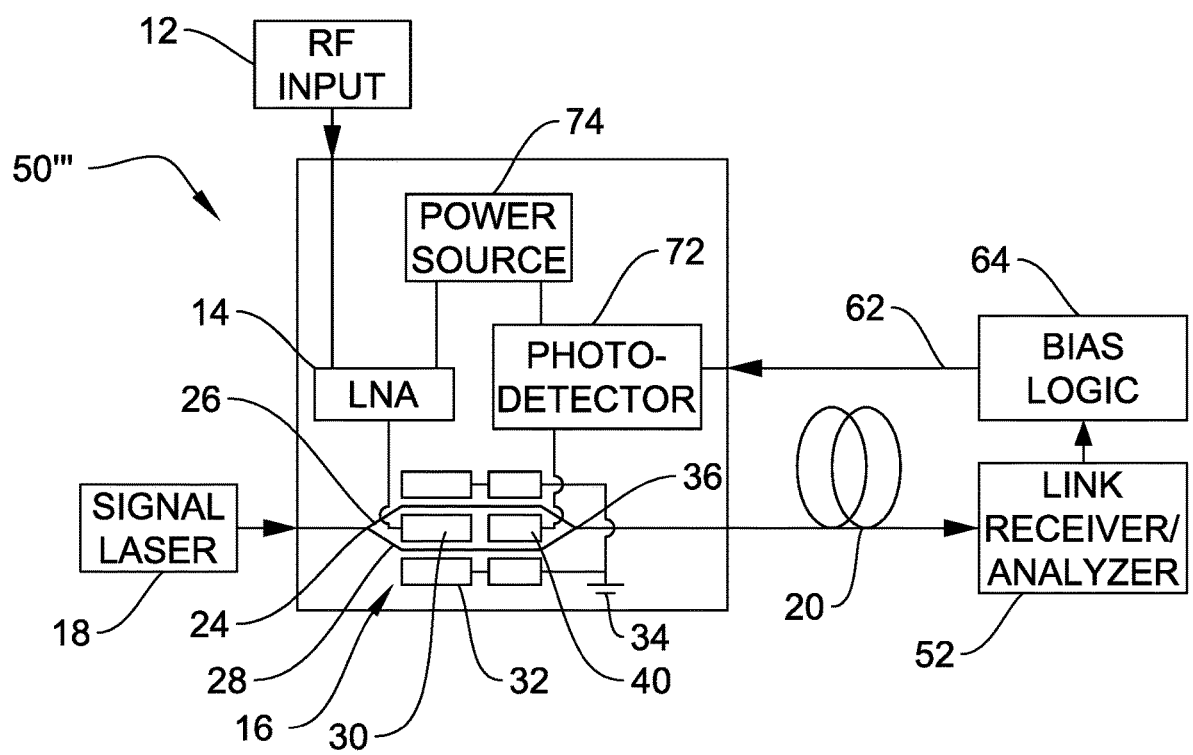
FIG. 5 is a diagram of a fourth embodiment of a photonic transmitter having local power and remote bias control.

FIG. 5 shows yet another alternate embodiment 50''' in which the bias control signal is provided externally while the LNA 14 is powered from sources at the remote location. As in FIGS. 2 and 3, above, a bias control signal on optical fiber bias link 62 is provided by bias logic 64. A photodetector 72 is joined to receive the bias control signal from the optical fiber bias link 62. Photodetector 72 can be a photodiode that provides its own power from the bias control signal as in FIG. 2, or it can be a photoresistor as in FIG. 3 that changes resistance in response to the bias control signal. In the latter case, bias voltage would need to originate from a power source 74 at the remote location. Power source 74 can also be used to supplement bias voltage provided by the photodiode embodiment.

Preserving efficient signal communication among the components and reducing insertion losses is a goal of this invention. Monolithic integration may be possible if the intensity modulator is made of III-V semiconductor materials. Flip-chip bonding can also be used for component integration, monolithic integration is also possible.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed; and obviously, many modification and variations are possible in light of the above teaching. Such modifications and variations that may be apparent to a person skilled in the art are intended to be included within the scope of this invention as defined by the accompanying claims.

What is claimed is:

1. An apparatus for an optically biased photonic link to receive a radio frequency signal and to provide an output signal, the apparatus comprising:

a signal laser for providing an optical signal;

an optical intensity modulator having a modulating electrode, a bias electrode, and an optical signal input to receive the signal laser optical signal, said optical intensity modulator providing a modulated optical signal in response to voltage provided to one of the modulating electrode, the bias electrode, or both electrodes;

a low noise amplifier to receive the radio frequency signal and to provide a modulation signal to said optical intensity modulator modulating electrode;

a photovoltaic array electrically joined to power said low noise amplifier and said optical intensity modulator;

a power laser optically connected to provide optical energy to said photovoltaic array;

a link receiver optically connected to receive said optical intensity modulator modulated optical signal and to analyze the intensity and non-linearity thereof, said link receiver having an analysis signal output and a signal output;

a bias logic circuit joined to said link receiver analysis signal output, said bias logic circuit providing an optical bias control signal in response to the analysis signal output; and an optical detector joined optically to said bias logic circuit to receive the optical bias control signal, said optical detector being electrically joined to said photovoltaic array and said optical intensity modulator to provide a bias voltage to said optical intensity modulator bias electrode.

2. The apparatus of claim 1, wherein said optical detector comprises a photodiode joined to receive the optical bias control signal from said bias logic circuit and to provide a bias voltage to said optical intensity modulator bias electrode.

3. The apparatus of claim 1, wherein said optical detector comprises a photoresistor joined to receive the optical bias control signal from said bias logic circuit and to change resistivity in response to the optical bias control signal whereby the change in the resistivity results in a change in bias voltage provided to said optical intensity modulator bias electrode.

4. An apparatus for an optically biased photonic link to receive a radio frequency signal and to provide an output signal, the apparatus comprising:

a signal laser capable of providing an optical signal;

an optical intensity modulator having a modulating electrode, a bias electrode, and an optical signal input to receive the signal laser optical signal, said optical intensity modulator providing a modulated optical signal in response to voltage provided to one of the modulating electrode, the bias electrode, or both electrodes;

a low noise amplifier to receive the radio frequency signal and to provide a modulation signal to said optical intensity modulator modulating electrode;

a link receiver optically connected to receive said optical intensity modulator modulated optical signal and capable of analyzing intensity and non-linearity thereof, said link receiver having an analysis signal output and a signal output;

a bias logic circuit joined to said link receiver analysis signal output, said bias logic circuit providing an optical bias control signal in response to the analysis signal output; and an optical detector joined optically to said bias logic circuit to receive the optical bias control signal, said optical detector being electrically joined to said optical intensity modulator to provide a bias voltage to said optical intensity modulator bias electrode.

5. The apparatus of claim 4, wherein said optical detector comprises a photodiode joined to receive the optical bias control signal from said bias logic circuit and to provide a bias voltage to said optical intensity modulator bias electrode.

6. The apparatus of claim 4, further comprising a power source joined to said optical detector wherein said optical detector comprises a photoresistor joined to receive the optical bias control signal from said bias logic circuit and to change resistivity in response to the optical bias control signal whereby the change in the resistivity results in a change in bias voltage provided to said optical intensity modulator bias electrode.

* * * * *